United States Patent
Liu

(10) Patent No.: US 10,411,464 B2
(45) Date of Patent: Sep. 10, 2019

(54) CURRENT-LIMITING PROTECTION CIRCUIT AND ELECTRONIC DEVICE

(71) Applicant: Huawei Technologies Co., Ltd., Shenzhen (CN)

(72) Inventor: Shengcai Liu, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 225 days.

(21) Appl. No.: 15/545,847

(22) PCT Filed: Jan. 22, 2015

(86) PCT No.: PCT/CN2015/071296
§ 371 (c)(1),
(2) Date: Jul. 24, 2017

(87) PCT Pub. No.: WO2016/115703
PCT Pub. Date: Jul. 28, 2016

(65) Prior Publication Data
US 2018/0013283 A1    Jan. 11, 2018

(51) Int. Cl.
*H02H 9/02* (2006.01)
*G05F 1/573* (2006.01)

(52) U.S. Cl.
CPC .............. *H02H 9/02* (2013.01); *G05F 1/5735* (2013.01)

(58) Field of Classification Search
CPC .......... G05F 1/569; G05F 1/571; G05F 1/573; G05F 1/5735; G05F 1/575; H01C 7/13;
(Continued)

(56) References Cited

U.S. PATENT DOCUMENTS

| 4,346,342 A | 8/1982 | Carollo |
| 6,621,259 B2* | 9/2003 | Jones ................ G01R 19/0092 324/123 C |

(Continued)

FOREIGN PATENT DOCUMENTS

| CN | 1362654 A | 8/2002 |
| CN | 1717644 A | 1/2006 |

(Continued)

OTHER PUBLICATIONS

Machine Translation and Abstract of Japanese Publication No. JP2003079139, Mar. 14, 2003, 8 pages.
(Continued)

*Primary Examiner* — Thienvu V Tran
*Assistant Examiner* — Nicolas Bellido
(74) *Attorney, Agent, or Firm* — Conley Rose, P.C.

(57) ABSTRACT

A current-limiting protection circuit and an electronic device are provided. The current-limiting protection circuit includes a power supply chip and a current-limiting circuit that is electrically connected to the power supply chip. The current-limiting circuit is configured to detect a charging current, and output a feedback voltage to the power supply chip. The power supply chip is configured to when the feedback voltage is greater than a second reference voltage, reduce an output voltage until the charging current reaches a preset value, where the second reference voltage is a preset internal voltage of the power supply chip.

8 Claims, 2 Drawing Sheets

(58) Field of Classification Search
CPC .......... H01L 33/00; H02H 3/025; H02H 3/08; H02H 9/00; H02H 9/001; H02H 9/02; H02H 9/021; H02H 9/025; H02H 9/028; H02M 3/155; H05B 37/02

See application file for complete search history.

(56) References Cited

U.S. PATENT DOCUMENTS

| | | | |
|---|---|---|---|
| 6,646,847 B2 * | 11/2003 | Poe | H02H 3/006 361/93.1 |
| 7,342,761 B2 | 3/2008 | Covault | |
| 2002/0118002 A1 | 8/2002 | Luo | |
| 2003/0178977 A1 | 9/2003 | Wu | |
| 2004/0004467 A1 | 1/2004 | Miyanaga et al. | |
| 2005/0128657 A1 | 6/2005 | Covault | |
| 2006/0250740 A1 | 11/2006 | Itoh et al. | |
| 2007/0035895 A1 | 2/2007 | Liu et al. | |
| 2012/0187931 A1 * | 7/2012 | Maruki | H02M 3/156 323/282 |

FOREIGN PATENT DOCUMENTS

| | | | |
|---|---|---|---|
| CN | 201536253 U | | 7/2010 |
| GB | 918466 A | | 2/1963 |
| JP | H1185293 A | | 3/1999 |
| JP | 2003079139 A | * | 3/2003 |
| JP | 2003079139 A | | 3/2003 |
| JP | 2005045850 A | | 2/2005 |
| JP | 2012095513 A | | 5/2012 |

OTHER PUBLICATIONS

Machine Translation and Abstract of Japanese Publication No. JP2005045850, Feb. 17, 2005, 12 pages.
Machine Translation and Abstract of Japanese Publication No. JP2012095513, May 17, 2012, 8 pages.
Machine Translation and Abstract of Japanese Publication No. JPH1185293, Mar. 30, 1999, 36 pages.
Foreign Communication From a Counterpart Application, Japanese Application No. 2017-538989, Japanese Office Action dated Jul. 23, 2018, 2 pages.
Foreign Communication From a Counterpart Application, Japanese Application No. 2017-538989, English Translation of Japanese Office Action dated Jul. 23, 2018, 3 pages.
Foreign Communication From a Counterpart Application, Chinese Application No. 201580019716.9, Chinese Office Action dated Apr. 26, 2018, 5 pages.
Foreign Communication From a Counterpart Application, European Application No. 15878381.1, Extended European Search Report dated Jan. 4, 2018, 8 pages.
Machine Translation and Abstract of Chinese Publication No. CN201536253, Jul. 28, 2010, 8 pages.
Foreign Communication From a Counterpart Application, PCT Application No. PCT/CN2015/071296, English Translation of International Search Report dated Sep. 29, 2015, 2 pages.
Foreign Communication From a Counterpart Application, PCT Application No. PCT/CN2015/071296, English Translation of Written Opinion dated Sep. 29, 2015, 5 pages.

* cited by examiner

CURRENT-LIMITING PROTECTION CIRCUIT AND ELECTRONIC DEVICE

CROSS-REFERENCE TO RELATED APPLICATIONS

This application is a U.S. National Stage of International Patent Application No. PCT/CN2015/071296 filed on Jan. 22, 2015, which is hereby incorporated by reference in its entirety.

TECHNICAL FIELD

Embodiments of the present disclosure relate to the circuit field, and in particular, to a current-limiting protection circuit and an electronic device.

BACKGROUND

It is convenient to carry and use a mobile handheld terminal such as a smartphone or a tablet computer. In addition, as the mobile handheld terminal develops towards multi-functionalization and high efficiency, a user may perform an activity at any time, such as video watching, online reading, online game, or instant messaging. The mobile handheld terminal is increasingly popular to the user. Compared with usage convenience of the mobile handheld terminal, a battery standby time of the mobile handheld terminal cannot meet the user's requirement. Therefore, an electronic product with an external charging function appears, such as a mobile power pack. To ensure device safety, these electronic products perform appropriate current-limiting setting on a charging current during external charging.

FIG. 1 is a schematic structural diagram of a current-limiting solution. As shown in FIG. 1, a specific principle of implementing a current-limiting function by disposing a dedicated linear current-limiting chip 12 in a post amplifier of a power supply chip 11 includes when the charging current is greater than a set current threshold, conductive impedance of the linear current-limiting chip 12 is linearly increased to reduce the charging current, until the charging current is equal to the set current threshold. Therefore, a limitation on the charging current is implemented.

However, the current-limiting solution has the following disadvantages. Because heat protection started by an external charging device is easily caused in an over-current state due to heat generated when the conductive impedance is increased, that is, a path loss is increased, the external charging function is disabled, resources are wasted, and charging efficiency is reduced.

SUMMARY

Embodiments of the present disclosure provide a current-limiting protection circuit and an electronic device. Constant-voltage output is changed to constant-current output when a charging current exceeds a limit such that the charging current is limited, resources are reduced, and charging efficiency is improved.

According to a first aspect, an embodiment of the present disclosure provides a current-limiting protection circuit, including a power supply chip and a current-limiting circuit that is electrically connected to the power supply chip, where the power supply chip has an output pin and a feedback pin. The current-limiting circuit includes a current sampling resistor, at least one voltage conversion resistor, a first operational amplifier, a triode, a first voltage divider resistor, a second voltage divider resistor, and a diode. The output pin is connected to one end of the current sampling resistor. A negative input end of the first operational amplifier is connected to one end of a first voltage conversion resistor, the other end of the first voltage conversion resistor is connected to the one end of the current sampling resistor, a positive input end of the first operational amplifier is connected to one end of a second voltage conversion resistor, the other end of the second voltage conversion resistor is connected to the other end of the current sampling resistor, an output end of the first operational amplifier is connected to a base of the triode, an emitter of the triode is connected to the negative input end of the first operational amplifier, a collector of the triode is connected to one end of a third voltage conversion resistor, and the other end of the third voltage conversion resistor is grounded. The first voltage divider resistor is connected to the second voltage divider resistor in series, one end of the first voltage divider resistor is connected to the other end of the current sampling resistor, and one end of the second voltage divider resistor is grounded. A positive electrode of the diode is connected to the one end of the third voltage conversion resistor, and a negative electrode of the diode is separately connected to the other end of the second voltage divider resistor and the feedback pin. The power supply chip is configured to convert an input first voltage into a second voltage, and output the second voltage to the current-limiting circuit using the output pin. The current-limiting circuit is configured to detect a first current that passes through the current sampling resistor, convert the first current into a third voltage using the voltage conversion resistors, the first operational amplifier, and the triode, output a first reference voltage using the first voltage divider resistor and the second voltage divider resistor, and output the feedback voltage to the feedback pin according to the third voltage and the first reference voltage, and the power supply chip is further configured to reduce the second voltage until the first current reaches a preset value when the feedback voltage is greater than a second reference voltage, where the second reference voltage is a preset internal voltage of the power supply chip.

With reference to the first aspect, in a first possible implementation manner of the first aspect, the current-limiting circuit further includes a second operational amplifier, and that a positive electrode of the diode is connected to the one end of the third voltage conversion resistor, and a negative electrode of the diode is separately connected to the other end of the second voltage divider resistor and the feedback pin includes that a positive input end of the second operational amplifier is connected to the other end of the second voltage divider resistor, a negative input end of the second operational amplifier is connected to the one end of the third voltage conversion resistor, an output end of the second operational amplifier is connected to the positive electrode of the diode, and the negative electrode of the diode is separately connected to the negative input end of the second operational amplifier and the feedback pin.

With reference to the first aspect, in a second possible implementation manner of the first aspect, outputting the feedback voltage to the feedback pin according to the third voltage and the first reference voltage includes that the feedback voltage is a difference between the third voltage and the positive break-over voltage of the diode if the third voltage is greater than a sum of the first reference voltage and a positive break-over voltage of the diode, or the feedback voltage is the first reference voltage if the third voltage is less than or equal to a sum of the first reference voltage and a positive break-over voltage of the diode.

With reference to the first possible implementation manner of the first aspect, in a third possible implementation manner of the first aspect, outputting the feedback voltage to the feedback pin according to the third voltage and the first reference voltage includes that the feedback voltage is the third voltage if the third voltage is greater than the first reference voltage, or the feedback voltage is the first reference voltage if the third voltage is less than or equal to the first reference voltage.

According to a second aspect, an embodiment of the present disclosure provides an electronic device, including a current-limiting protection circuit and a power supply interface that is connected to the current-limiting protection circuit, where the power supply interface is configured to connect to a load such that the electronic device supplies power to the load. The current-limiting protection circuit includes a power supply chip and a current-limiting circuit that is electrically connected to the power supply chip, where the power supply chip has an output pin and a feedback pin. The current-limiting circuit includes a current sampling resistor, at least one voltage conversion resistor, a first operational amplifier, a triode, a first voltage divider resistor, a second voltage divider resistor, and a diode. The output pin is connected to one end of the current sampling resistor, a negative input end of the first operational amplifier is connected to one end of a first voltage conversion resistor, the other end of the first voltage conversion resistor is connected to the one end of the current sampling resistor, a positive input end of the first operational amplifier is connected to one end of a second voltage conversion resistor, the other end of the second voltage conversion resistor is connected to the other end of the current sampling resistor, an output end of the first operational amplifier is connected to a base of the triode, an emitter of the triode is connected to the negative input end of the first operational amplifier, a collector of the triode is connected to one end of a third voltage conversion resistor, and the other end of the third voltage conversion resistor is grounded. The first voltage divider resistor is connected to the second voltage divider resistor in series, one end of the first voltage divider resistor is connected to the other end of the current sampling resistor, and one end of the second voltage divider resistor is grounded, a positive electrode of the diode is connected to the one end of the third voltage conversion resistor, and a negative electrode of the diode is separately connected to the other end of the second voltage divider resistor and the feedback pin. The power supply chip is configured to convert an input first voltage into a second voltage, and output the second voltage to the current-limiting circuit using the output pin. The current-limiting circuit is configured to detect a first current that passes through the current sampling resistor, convert the first current into a third voltage using the voltage conversion resistors, the first operational amplifier, and the triode, output a first reference voltage using the first voltage divider resistor and the second voltage divider resistor, and output the feedback voltage to the feedback pin according to the third voltage and the first reference voltage, and the power supply chip is further configured to reduce the second voltage until the first current reaches a preset value when the feedback voltage is greater than a second reference voltage, where the second reference voltage is a preset internal voltage of the power supply chip.

With reference to the second aspect, in a first possible implementation manner of the second aspect, the current-limiting circuit further includes a second operational amplifier, and that a positive electrode of the diode is connected to the one end of the third voltage conversion resistor, and a negative electrode of the diode is separately connected to the other end of the second voltage divider resistor and the feedback pin includes that a positive input end of the second operational amplifier is connected to the other end of the second voltage divider resistor, a negative input end of the second operational amplifier is connected to the one end of the third voltage conversion resistor, an output end of the second operational amplifier is connected to the positive electrode of the diode, and the negative electrode of the diode is separately connected to the negative input end of the second operational amplifier and the feedback pin.

With reference to the second aspect, in a second possible implementation manner of the second aspect, outputting the feedback voltage to the feedback pin according to the third voltage and the first reference voltage includes that the feedback voltage is a difference between the third voltage and the positive break-over voltage of the diode if the third voltage is greater than a sum of the first reference voltage and a positive break-over voltage of the diode, or the feedback voltage is the first reference voltage if the third voltage is less than or equal to a sum of the first reference voltage and a positive break-over voltage of the diode.

With reference to the first possible implementation manner of the second aspect, in a third possible implementation manner of the second aspect, outputting the feedback voltage to the feedback pin according to the third voltage and the first reference voltage includes that the feedback voltage is the third voltage if the third voltage is greater than the first reference voltage, or the feedback voltage is the first reference voltage if the third voltage is less than or equal to the first reference voltage.

The embodiments of the present disclosure provide the current-limiting protection circuit and the electronic device. The current-limiting protection circuit includes a power supply chip and a current-limiting circuit that is electrically connected to the power supply chip. The power supply chip has an output pin and a feedback pin. The power supply chip converts an input first voltage into a second voltage, and outputs the second voltage to the current-limiting circuit using the output pin. The current-limiting circuit detects a first current that passes through a current sampling resistor, and outputs a feedback voltage to the feedback pin. The power supply chip is further configured to reduce the second voltage until the first current reaches a preset value when the feedback voltage is greater than a second reference voltage, where the second reference voltage is a preset internal voltage of the power supply chip. According to the current-limiting protection circuit provided in the embodiments of the present disclosure, when a charging current exceeds a limit, the power supply chip reduces an output voltage in order to reduce the charging current. Therefore, constant-voltage output is changed to constant-current output when the charging current exceeds a limit such that a current-limiting objective is achieved, no extra heat generated due to a path loss is additionally increased, external charging may be sustained, resources are reduced, and charging efficiency is improved.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the pres

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
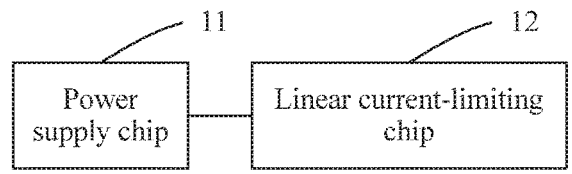
- FIG. 1 is a schematic structural diagram of a current-limiting solution.
Figure 2:
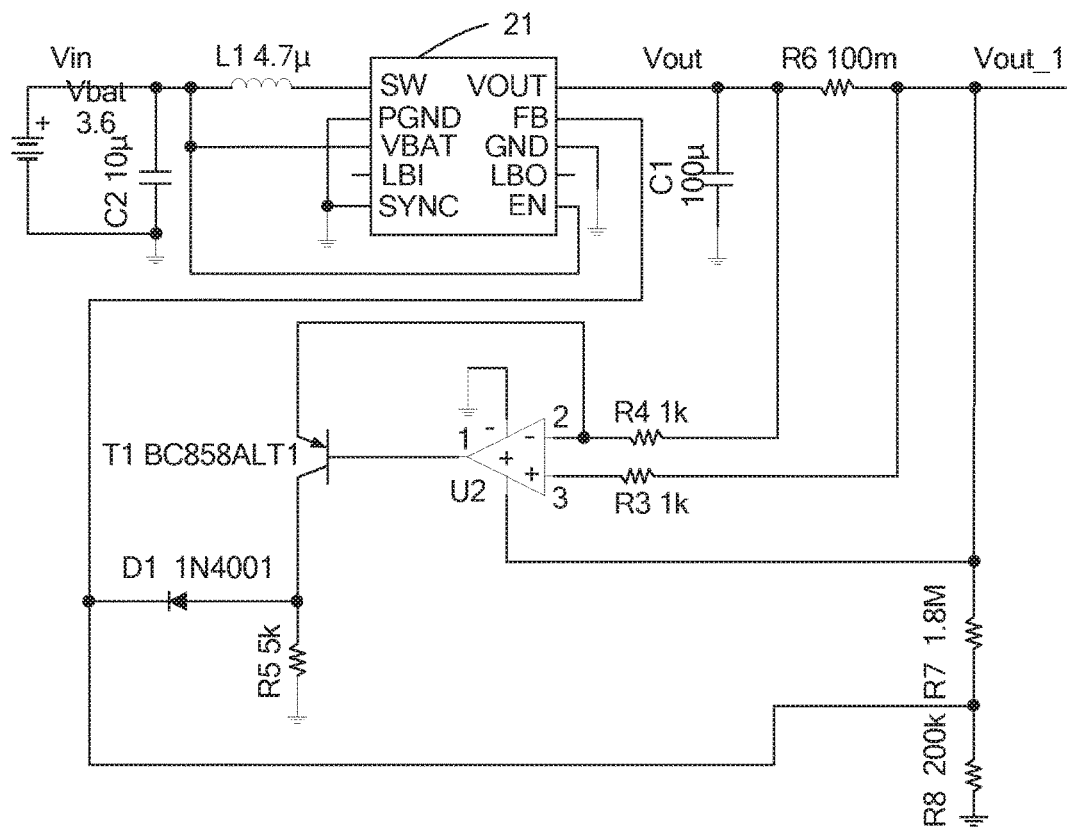
FIG. 2 is a schematic structural diagram of Embodiment 1 of a current-limiting protection circuit according to the present disclosure.

FIG. 2 is a schematic structural diagram of Embodiment 1 of a current-limiting protection circuit according to the present disclosure. As shown in FIG. 2, the current-limiting protection circuit may include a power supply chip 21 and a current-limiting circuit that is electrically connected to the power supply chip 21.

The power supply chip 21 has an output pin VOUT and a feedback pin FB.

The current-limiting circuit includes a current sampling resistor R6, at least one voltage conversion resistor, a first operational amplifier U2, a triode T1, a first voltage divider resistor R7, a second voltage divider resistor R8, and a diode D1.

The output pin VOUT is connected to one end of the current sampling resistor R6. A negative input end 2 of the first operational amplifier U2 is connected to one end of a first voltage conversion resistor R4, and the other end of the first voltage conversion resistor R4 is connected to the one end of the current sampling resistor R6. A positive input end 3 of the first operational amplifier U2 is connected to one end of a second voltage conversion resistor R3, and the other end of the second voltage conversion resistor R3 is connected to the other end of the current sampling resistor R6. An output end 1 of the first operational amplifier U2 is connected to a base of the triode T1, an emitter of the triode T1 is connected to the negative input end 2 of the first operational amplifier U2, a collector of the triode T1 is connected to one end of a third voltage conversion resistor R5, and the other end of the third voltage conversion resistor R5 is grounded.

The first voltage divider resistor R7 is connected to the second voltage divider resistor R8 in series, one end of the first voltage divider resistor R7 is connected to the other end of the current sampling resistor R6, and one end of the second voltage divider resistor R8 is grounded.

A positive electrode of the diode D1 is connected to the one end of the third voltage conversion resistor R5, a negative electrode of the diode D1 is separately connected to the other end of the second voltage divider resistor R8 and the feedback pin FB.

The power supply chip 21 is further configured to convert an input first voltage $V_{in}$ into a second voltage $V_{out}$, and output the second voltage $V_{out}$ to the current-limiting circuit using the output pin VOUT.

The current-limiting circuit is further configured to detect a first current I that passes through the current sampling resistor R6, convert the first current I into a third voltage $V_{cov}$ using voltage conversion resistors, the first operational amplifier U2, and the triode T1, output a first reference voltage $V_{th}$ using the first voltage divider resistor R7 and the second voltage divider resistor R8, and output a feedback voltage $V_{FB}$ to the feedback pin FB according to the third voltage $V_{cov}$ and the first reference voltage $V_{th}$.

The power supply chip is further configured to reduce the second voltage $V_{out}$ until the first current I reaches a preset value when the feedback voltage $V_{FB}$ is greater than a second reference voltage $V_{FB\_th}$. The second reference voltage $V_{FB\_th}$ is a preset internal voltage of the power supply chip 21.

A working principle of the current-limiting protection circuit provided in this embodiment is as follows.

The power supply chip 21 may convert an input voltage into a required voltage for constant output, that is, may convert the input first voltage $V_{in}$ into the second voltage $V_{out}$ for constant output using the output pin VOUT. In this embodiment, an energy input source of the power supply chip 21 is a battery Vbat. An inductor L1 and a capacitor C1 cooperate with the power supply chip 21 to implement conversion from an input voltage to an output voltage. It should be noted that the energy input source of the power supply chip 21 may be a battery, or may be another energy input source, such as a capacitor C2. The present disclosure sets no limitation thereto.

The power supply chip 21 may further adjust the output second voltage $V_{out}$ according to the feedback voltage $V_{FB}$ received by the feedback pin FB and the second reference voltage $V_{FB\_th}$. The second reference voltage $V_{FB\_th}$ is a preset internal voltage of the power supply chip 21. Further, when the feedback voltage $V_{FB}$ is less than the second reference voltage $V_{FB\_th}$, the power supply module 21 increases the output second voltage $V_{out}$. When the feedback voltage $V_{FB}$ is greater than the second reference voltage $V_{FB\_th}$, the power supply module 21 reduces the output second voltage $V_{out}$. When the feedback voltage $V_{FB}$ is equal to the second reference voltage $V_{FB\_th}$, the power supply module 21 remains the output second voltage $V_{out}$ unadjusted. It can be learned that when the power supply chip 21 stably works, the feedback voltage $V_{FB}$ is equal to the second reference voltage $V_{FB\_th}$.

The power supply chip 21 inputs the second voltage $V_{out}$ to the current-limiting circuit. The current sampling resistor R6 may detect the first current I that passes through the resistor, and the first current I is a charging current.

The first current I is converted into the third voltage $V_{cov}$ using the first voltage conversion resistor R4, the second voltage conversion resistor R3, the third voltage conversion resistor R5, the first operational amplifier U2, and the triode T1. Further, a voltage of the one end of the third voltage conversion resistor R5 is the third voltage $V_{cov}$. It can be learned according to a virtual short circuit of the first operational amplifier U2 that, a voltage of the one end of the first voltage conversion resistor R4 is equal to a voltage of the one end of the second voltage conversion resistor R3. It can be learned according to a virtual open circuit of the first operational amplifier U2 that, there is no current at input ends, and the voltage of the one end of the second voltage conversion resistor R3 is equal to a voltage of the other end of the current sampling resistor R6, that is, the voltage of the one end of the first voltage conversion resistor R4 is equal to the voltage at the other end of the current sampling resistor R6. In other words, a voltage difference between two ends of the first voltage conversion resistor R4 is equal to a voltage difference between two ends of the current sampling resistor R6, that is, $I_{R4}*R4=I*R6$. It can be learned according to the virtual open circuit of the first operational amplifier U2 that, there is no current at the input ends, and a current that passes through the first voltage conversion resistor R4 is approximately equal to a current that passes through the third voltage conversion resistor R5, that is, $I_{R4}=I_{R5}$. Therefore, the current that passes through the third voltage conversion resistor R5 is $I_{R5}=I_R=(I*R6)/R4$, and the voltage of the one end of the third voltage conversion resistor R5 is $V_{R5}=I_{R5}*R5=(I*R6*R5)/R4$, that is, the third voltage is $V_{cov}=V_{R5}=(I*R6*R5)/R4$. The triode T1 is configured to form negative feedback of an operational amplifier, and the second voltage conversion resistor R3 is configured to compensate a bias current of an input end of the first operational amplifier U2.

The first reference voltage $V_{th}$ is output using the first voltage divider resistor R7 and the second voltage divider resistor R8. Further, a voltage of the other end of the second voltage divider resistor R8 is the first reference voltage $V_{th}$, a voltage of the one end of the first voltage divider resistor R7 is $V_{out\_1}$, and the first voltage divider resistor R7 is connected to the second voltage divider resistor R8 in series. Therefore, the voltage of the other end of the second voltage divider resistor R8 is $V_{R8}=I_{R8}*R8=(V_{out\_1}*R8)/(R7+R8)$, that is, the first reference voltage is $V_{th}=V_{R8}=(V_{out\_1}*R8)/(R7+R8)$.

The feedback voltage $V_{FB}$ is output to the feedback pin FB according to the third voltage $V_{cov}$ and the first reference voltage $V_{th}$. Further, a voltage of the negative electrode of the diode D1 is the first reference voltage $V_{th}$, and a voltage of the positive electrode of the diode D1 is the third voltage $V_{cov}$. In addition, the negative electrode of the diode D1 is connected to the feedback pin FB, and outputs the feedback voltage $V_{FB}$ to the feedback pin FB. When the first current I does not exceed a limit, the third voltage $V_{cov}$ is less than or equal to a sum of the first reference voltage $V_{th}$ and a positive break-over voltage $V_{D1}$ of the diode D1, the diode D1 is cut off, and the feedback voltage $V_{FB}$ is the first reference voltage $V_{th}$, that is, $V_{FB}=V_{th}$. In this case, the power supply chip 21 remains constant-voltage output in a stable working state, and the feedback voltage $V_{FB}$ is the first reference voltage $V_{th}$ and is equal to the second reference voltage $V_{FB\_th}$. When the first current I exceeds a limit, the third voltage $V_{cov}$ is greater than the sum of the first reference voltage $V_{th}$ and the positive break-over voltage $V_{D1}$ of the diode D1, the diode D1 is conducting, the feedback voltage $V_{FB}$ is a difference between the third voltage $V_{cov}$ and the positive break-over voltage $V_{D1}$ of the diode, that is, $V_{FB}=V_{cov}-V_{D1}$. In this case, the feedback voltage $V_{FB}$ is greater than the second reference voltage $V_{FB\_th}$, the power supply chip 21 reduces the second voltage $V_{out}$ until the feedback voltage $V_{FB}$ is equal to the second reference voltage $V_{FB\_th}$, that is, $V_{FB\_th}=V_{FB}=V_{cov}-V_{D1}=(I*R6*R5/R4)-V_{D1}$, that is, $I=(V_{FB\_th}+V_{D1})*R4/(R5*R6)$. In this case, the power supply chip 21 outputs a constant current, that is, when the current exceeds a limit, constant-voltage output is changed to constant-current output by the power supply chip 21 in order to achieve a current-limiting objective. Because the power supply chip 21 performs current limiting by dynamically adjusting an output voltage, when the charging current exceeds a limit, the charging current is reduced by reducing the output voltage such that no extra heat generated due to a path loss is additionally increased, external charging may be sustained, resources are reduced, and charging efficiency is improved.

It should be noted that parameters of the power supply chip, the battery, the resistor, the capacitor, and the inductor shown in FIG. 2 are only examples. A specific model and a specific parameter may be adjusted according to the power supply chip and a product requirement.

It should be noted that according to the current-limiting protection circuit provided in this embodiment of the present disclosure, a back end may be connected to a load, and is configured to supply power to the load. The load may be an external load, or may be an internal load of an electronic device. The present disclosure sets no limitation thereto.

This embodiment of the present disclosure provides a current-limiting protection circuit, including a power supply chip and a current-limiting circuit that is electrically connected to the power supply chip. The power supply chip has an output pin and a feedback pin. The power supply chip converts an input first voltage into a second voltage, and outputs the second voltage to the current-limiting circuit using the output pin. The current-limiting circuit detects a first current that passes through a current sampling resistor, and outputs a feedback voltage to the feedback pin. The power supply chip is further configured to reduce the second voltage until the first current reaches a preset value when the feedback voltage is greater than a second reference voltage, where the second reference voltage is a preset internal voltage of the power supply chip. According to the current-limiting protection circuit provided in this embodiment of the present disclosure, when a charging current exceeds a limit, the power supply chip reduces an output voltage in order to reduce the charging current. Therefore, constant-voltage output is changed to constant-current output when the charging current exceeds a limit such that a current-limiting objective is achieved, no extra heat generated due to a path loss is additionally increased, external charging may be sustained, resources are reduced, and charging efficiency is improved.

Figure 3:
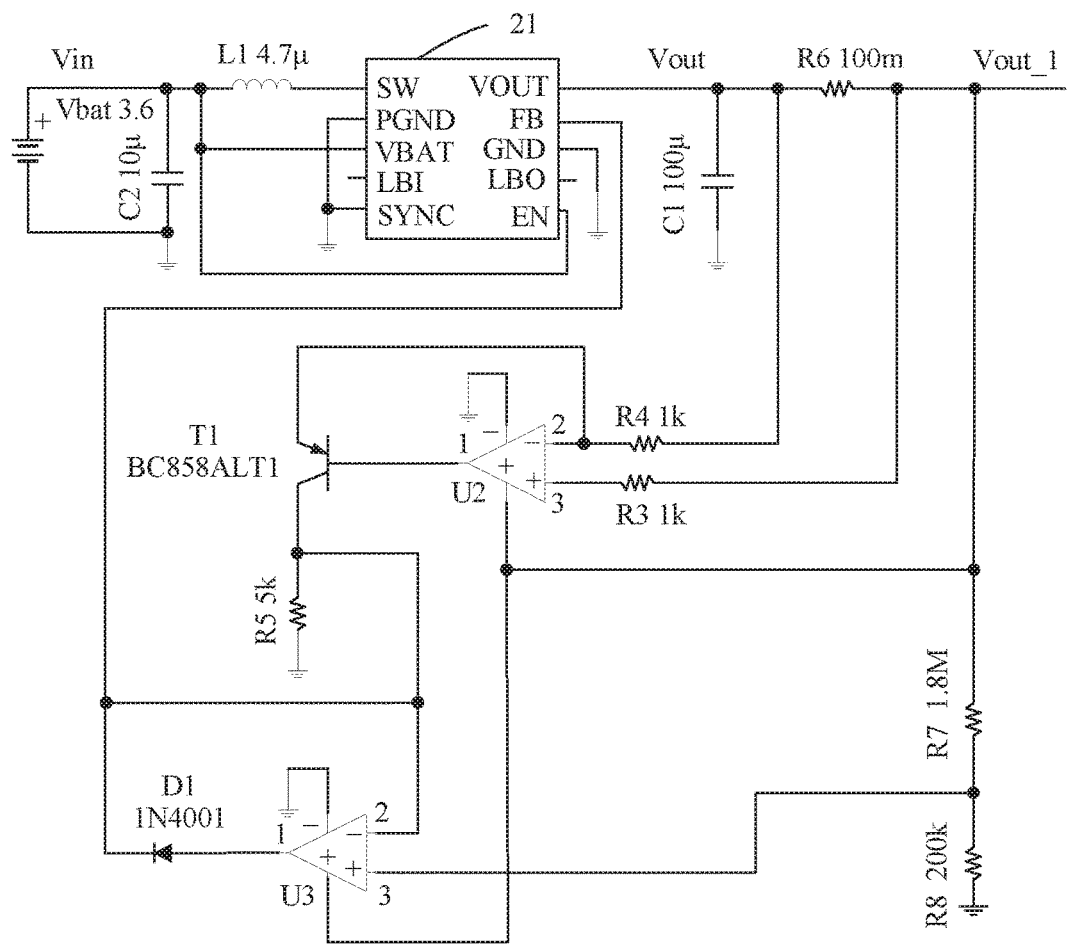
FIG. 3 is a schematic structural diagram of Embodiment 2 of a current-limiting protection circuit according to the present disclosure.

FIG. 3 is a schematic structural diagram of Embodiment 2 of a current protection circuit according to the present disclosure. On the basis of Embodiment 1, this embodiment provides another feasible structure of a current-limiting circuit. As shown in FIG. 3, the current-limiting protection circuit may include a power supply chip 21 and a current-limiting circuit that is electrically connected to the power supply chip 21.

The power supply chip 21 has an output pin VOUT and a feedback pin FB.

The current-limiting circuit includes a current sampling resistor R6, at least one voltage conversion resistor, a first operational amplifier U2, a triode T1, a first voltage divider resistor R7, a second voltage divider resistor R8, and a diode D1.

The output pin VOUT is connected to one end of the current sampling resistor R6. A negative input end 2 of the first operational amplifier U2 is connected to one end of a first voltage conversion resistor R4, and the other end of the first voltage conversion resistor R4 is connected to the one end of the current sampling resistor R6. A positive input end 3 of the first operational amplifier U2 is connected to one end of a second voltage conversion resistor R3, and the other end of the second voltage conversion resistor R3 is connected to the other end of the current sampling resistor R6. An output end 1 of the first operational amplifier U2 is connected to a base of the triode T1, an emitter of the triode T1 is connected to the negative input end 2 of the first operational amplifier U2, a collector of the triode T1 is connected to one end of a third voltage conversion resistor R5, and the other end of the third voltage conversion resistor R5 is grounded.

The first voltage divider resistor R7 is connected to the second voltage divider resistor R8 in series, one end of the first voltage divider resistor R7 is connected to the other end of the current sampling resistor R6, and one end of the second voltage divider resistor R8 is grounded.

A positive input end 3 of a second operational amplifier U3 is connected to the other end of the second voltage divider resistor R8, a negative input end 2 of the second operational amplifier U3 is connected to the one end of the third voltage conversion resistor R5, an output end 1 of the second operational amplifier U3 is connected to the positive electrode of the diode D1, and the negative electrode of the diode D1 is separately connected to the negative input end 2 of the second operational amplifier U3 and the feedback pin FB.

Functions of the power supply chip 21 and a corresponding component in this embodiment are similar to those in Embodiment 1, and details are not described herein again.

In this embodiment, the current-limiting circuit further includes the second operational amplifier U3. The feedback voltage $V_{FB}$ is output to the feedback pin FB according to the third voltage $V_{cov}$ and the first reference voltage $V_{th}$. Further, a voltage of the positive input end of the second operational amplifier U3 is the first reference voltage $V_{th}$, and a voltage of the negative input end 2 of the second operational amplifier U3 is the third voltage $V_{cov}$. In addition, the negative electrode of the diode D1 is connected to the feedback pin FB, and the feedback voltage $V_{FB}$ is output to the feedback pin FB. When the first current I does not exceed a limit, the third voltage $V_{cov}$ is less than or equal to the first reference voltage $V_{th}$, that is, the voltage of the negative input end 2 of the second operational amplifier U3 is less than or equal to the voltage of the positive input end 3 of the second operational amplifier U3, a voltage $V_{FB}$ of the negative electrode of the diode D1 is accordingly equal to the voltage of the positive input end 3 of the second operational amplifier U3, that is, $V_{FB}=V_{th}$. In this case, the power supply chip 21 remains constant-voltage output in a stable working state, and the feedback voltage $V_{FB}$ is the first reference voltage $V_{th}$ and is equal to the second reference voltage $V_{FB\_th}$.

When the first current I exceeds a limit, the third voltage $V_{cov}$ is greater than the first reference voltage $V_{th}$, that is, the voltage of the negative input end 2 of the second operational amplifier U3 is greater than the voltage of the positive input end 3 of the second operational amplifier U3, the voltage $V_{FB}$ of the negative electrode of the diode D1 is accordingly equal to the voltage of the negative input end 2 of the second operational amplifier U3, that is, $V_{FB}=V_{cov}$. In this case, the feedback voltage $V_{FB}$ is greater than the second reference voltage $V_{FB\_th}$, the power supply chip 21 reduces the second voltage $V_{out}$ until the feedback voltage $V_{FB}$ is equal to the second reference voltage $V_{FB\_th}$, that is, $V_{FB\_th}=V_{FB}=V_{cov}=(I*R6*R5)/R4$, that is, $I=(V_{FB\_th}*R4)/(R5*R6)$. In this case, the power supply chip 21 outputs a constant current, that is, when the current exceeds a limit, constant-voltage output is changed to constant-current output by the power supply chip 21 in order to achieve a current-limiting objective. Because the power supply chip 21 performs current limiting by dynamically adjusting an output voltage, when the charging current exceeds a limit, the charging current is reduced by reducing the output voltage such that no extra heat generated due to a path loss is additionally increased, external charging may be sustained, resources are reduced, and charging efficiency is improved.

This embodiment of the present disclosure provides a current-limiting protection circuit, including a power supply chip and a current-limiting circuit that is electrically connected to the power supply chip. The power supply chip has an output pin and a feedback pin. The power supply chip converts an input first voltage into a second voltage, and outputs the second voltage to the current-limiting circuit using the output pin. The current-limiting circuit detects a first current that passes through a current sampling resistor, and outputs a feedback voltage to the feedback pin. The power supply chip is further configured to when the feedback voltage is greater than a second reference voltage, reduce the second voltage until the first current reaches a preset value, where the second reference voltage is a preset internal voltage of the power supply chip. According to the current-limiting protection circuit provided in this embodiment of the present disclosure, when a charging current exceeds a limit, the power supply chip reduces an output voltage in order to reduce the charging current. Therefore, constant-voltage output is changed to constant-current output when the charging current exceeds a limit such that a current-limiting objective is achieved, no extra heat generated due to a path loss is additionally increased, external charging may be sustained, resources are reduced, and charging efficiency is improved.

Figure 4:
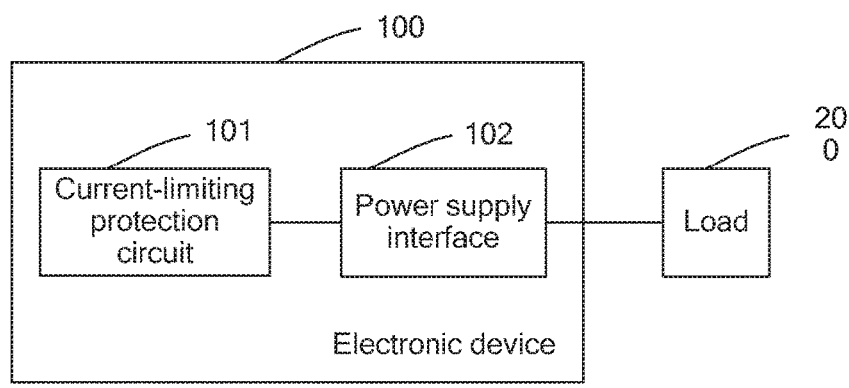
FIG. 4 is a schematic structural diagram of Embodiment 1 of an electronic device according to the present disclosure.

FIG. 4 is a schematic structural diagram of Embodiment 1 of an electronic device according to the present disclosure. Further refer to FIG. 2 to FIG. 4. The electronic device 100 may include a current-limiting protection circuit 101 and a power supply interface 102 that is connected to the current-limiting protection circuit 101. The power supply interface 102 is configured to connect to a load 200 such that the electronic device 100 supplies power to the load 200.

The current-limiting protection circuit 101 may be the current-limiting protection circuit shown in FIG. 2. The current-limiting protection circuit 101 includes a power supply chip 21 and a current-limiting circuit that is electrically connected to the power supply chip 21.

The power supply chip 21 has an output pin VOUT and a feedback pin FB.

The current-limiting circuit includes a current sampling resistor R6, at least one voltage conversion resistor, a first operational amplifier U2, a triode T1, a first voltage divider resistor R7, a second voltage divider resistor R8, and a diode D1.

The output pin VOUT is connected to one end of the current sampling resistor R6. A negative input end 2 of the first operational amplifier U2 is connected to one end of a first voltage conversion resistor R4, and the other end of the first voltage conversion resistor R4 is connected to the one end of the current sampling resistor R6. A positive input end 3 of the first operational amplifier U2 is connected to one end of a second voltage conversion resistor R3, and the other end of the second voltage conversion resistor R3 is connected to the other end of the current sampling resistor R6. An output end 1 of the first operational amplifier U2 is connected to a base of the triode T1, an emitter of the triode T1 is connected to the negative input end 2 of the first operational amplifier U2, a collector of the triode T1 is connected to one end of a third voltage conversion resistor R5, and the other end of the third voltage conversion resistor R5 is grounded.

The first voltage divider resistor R7 is connected to the second voltage divider resistor R8 in series, one end of the first voltage divider resistor R7 is connected to the other end of the current sampling resistor R6, and one end of the second voltage divider resistor R8 is grounded.

A positive electrode of the diode D1 is connected to the one end of the third voltage conversion resistor R5, a negative electrode of the diode D1 is separately connected to the other end of the second voltage divider resistor R8 and the feedback pin FB.

The power supply chip 21 is further configured to convert an input first voltage $V_{in}$ into a second voltage $V_{out}$, and output the second voltage $V_{out}$ to the current-limiting circuit using the output pin VOUT.

The current-limiting circuit is further configured to detect a first current I that passes through the current sampling resistor R6, convert the first current I into a third voltage $V_{cov}$ using voltage conversion resistors, the first operational amplifier U2, and the triode T1, output a first reference voltage $V_{th}$ using the first voltage divider resistor R7 and the second voltage divider resistor R8, and output a feedback voltage $V_{FB}$ to the feedback pin FB according to the third voltage $V_{cov}$ and the first reference voltage $V_{th}$.

The power supply chip is further configured to when the feedback voltage $V_{FB}$ is greater than a second reference voltage $V_{FB\_th}$, reduce the second voltage $V_{out}$ until the first current I reaches a preset value. The second reference voltage $V_{FB\_th}$ is a preset internal voltage of the power supply chip 21.

Optionally, outputting the feedback voltage $V_{FB}$ to the feedback pin FB according to the third voltage $V_{cov}$ and the first reference voltage $V_{th}$ may include that the feedback voltage is a difference between the third voltage $V_{cov}$ and the positive break-over voltage $V_{D1}$ of the diode D1 if the third voltage $V_{cov}$ is greater than a sum of the first reference voltage $V_{th}$ and a positive break-over voltage $V_{D1}$ of the diode D1, or the feedback voltage is the first reference voltage $V_{th}$ if the third voltage $V_{cov}$ is less than or equal to a sum of the first reference voltage $V_{th}$ and a positive break-over voltage $V_{D1}$ of the diode D1.

Optionally, the current-limiting protection circuit 101 may also be the current-limiting protection circuit shown in FIG. 3. The current-limiting protection circuit 101 may further include a second operational amplifier U3.

That a positive electrode of the diode D1 is connected to the one end of the third voltage conversion resistor R5, and a negative electrode of the diode D1 is separately connected to the other end of the second voltage divider resistor R8 and the feedback pin FB is correspondingly a positive input end 3 of the second operational amplifier U3 is connected to the other end of the second voltage divider resistor R8, a negative input end 2 of the second operational amplifier U3 is connected to the one end of the third voltage conversion resistor R5, an output end 1 of the second operational amplifier U3 is connected to the positive electrode of the diode D1, and the negative electrode of the diode D1 is separately connected to the negative input end 2 of the second operational amplifier U3 and the feedback pin FB.

Optionally, outputting the feedback voltage to the feedback pin according to the third voltage $V_{cov}$ and the first reference voltage $V_{th}$ may include that the feedback voltage is the third voltage $V_{cov}$ if the third voltage $V_{cov}$ is greater than the first reference voltage $V_{th}$, or the feedback voltage is the first reference voltage $V_{th}$ if the third voltage $V_{cov}$ is less than or equal to the first reference voltage $V_{th}$.

A specific working principle and a technical effect of the current-limiting protection circuit 101 are similar to those in the foregoing embodiments, and details are not described herein again.

This embodiment of the present disclosure provides the electronic device 100, including the current-limiting protection circuit 101 and the power supply interface 102 that is connected to the current-limiting protection circuit 101. The power supply interface 102 is configured for the load 200 such that the electronic device 100 supplies power to the load 200. The current-limiting protection circuit 101 includes a power supply chip and a current-limiting circuit that is electrically connected to the power supply chip. The power supply chip has an output pin and a feedback pin. The power supply chip converts an input first voltage into a second voltage, and outputs the second voltage to the current-limiting circuit using the output pin. The current-limiting circuit detects a first current that passes through a current sampling resistor, and outputs a feedback voltage to the feedback pin. The power supply chip is further configured to reduce the second voltage until the first current reaches a preset value when the feedback voltage is greater than a second reference voltage, where the second reference voltage is a preset internal voltage of the power supply chip. According to the electronic device 100 provided in this embodiment of the present disclosure, when a charging current exceeds a limit, the power supply chip reduces an output voltage in order to reduce the charging current. Therefore, constant-voltage output is changed to constant-current output when the charging current exceeds a limit such that a current-limiting objective is achieved, no extra heat generated due to a path loss is additionally increased, external charging may be sustained, resources are reduced, and charging efficiency is improved.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A current-limiting protection circuit, comprising:
   a current-limiting circuit; and
   a power supply chip coupled to the current-limiting circuit, wherein the power supply chip comprises an output pin and a feedback pin,
   wherein the current-limiting circuit comprises:
   a current sampling resistor;
   at least one voltage conversion resistor;
   a first operational amplifier;
   a triode;
   a first voltage divider resistor;
   a second voltage divider resistor; and
   a diode,
   wherein the output pin is connected to one end of the current sampling resistor,
   wherein a negative input end of the first operational amplifier is connected to one end of a first voltage conversion resistor,
   wherein the other end of the first voltage conversion resistor is connected to the one end of the current sampling resistor,
   wherein a positive input end of the first operational amplifier is connected to one end of a second voltage conversion resistor, wherein the other end of the second voltage conversion resistor is connected to the other end of the current sampling resistor, wherein an output end of the first operational amplifier is connected to a base of the triode, wherein an emitter of the triode is connected to the negative input end of the first operational amplifier, wherein a collector of the triode is connected to one end of a third voltage conversion resistor, wherein the other end of the third voltage conversion resistor is grounded, wherein the first voltage divider resistor is connected to the second voltage divider resistor in series, wherein one end of the first voltage divider resistor is connected to the other end of the current sampling resistor, wherein one end of the second voltage divider resistor is grounded, wherein a positive electrode of the diode is connected to the one end of the third voltage conversion resistor, wherein a negative electrode of the diode is separately connected to the other end of the second voltage divider resistor and the feedback pin, wherein the power supply chip is configured to:
convert an input first voltage into a second voltage; and
output the second voltage to the current-limiting circuit using the output pin, wherein the current-limiting circuit is configured to:
detect a first current that passes through the current sampling resistor;
convert the first current into a third voltage using the at least one voltage conversion resistors, the first operational amplifier, and the triode;
output a first reference voltage using the first voltage divider resistor and the second voltage divider resistor; and
output a feedback voltage to the feedback pin according to the third voltage and the first reference voltage, wherein the power supply chip is further configured to reduce the second voltage until the first current reaches a preset value when the feedback voltage is greater than a second reference voltage, and wherein the second reference voltage is a preset internal voltage of the power supply chip.

2. The current-limiting protection circuit according to claim 1, wherein the current-limiting circuit further comprises a second operational amplifier, and wherein a positive electrode of the diode is connected to the one end of the third voltage conversion resistor, and a negative electrode of the diode is separately connected to the other end of the second voltage divider resistor and the feedback pin corresponds to:

a positive input end of the second operational amplifier connected to the other end of the second voltage divider resistor;
a negative input end of the second operational amplifier connected to the one end of the third voltage conversion resistor; and
an output end of the second operational amplifier connected to the positive electrode of the diode;
wherein the negative electrode of the diode is separately connected to the negative input end of the second operational amplifier and the feedback pin.

3. The current-limiting protection circuit according to claim 1, wherein outputting the feedback voltage to the feedback pin comprises that:

the feedback voltage is a difference between the third voltage and a positive break-over voltage of the diode when the third voltage is greater than a sum of the first reference voltage and the positive break-over voltage of the diode; and the feedback voltage is the first reference voltage when the third voltage is less than or equal to the sum of the first reference voltage and the positive break-over voltage of the diode.

4. The current-limiting protection circuit according to claim 2, wherein outputting the feedback voltage to the feedback pin comprises that:

the feedback voltage is the third voltage when the third voltage is greater than the first reference voltage; and the feedback voltage is the first reference voltage when the third voltage is less than or equal to the first reference voltage.

5. An electronic device, comprising:
a current-limiting protection circuit; and
a power supply interface coupled to the current-limiting protection circuit, wherein the power supply interface is configured to connect to a load such that the electronic device supplies power to the load, wherein the current-limiting protection circuit comprises:
a power supply chip; and
a current-limiting circuit coupled to the power supply chip, wherein the power supply chip comprises:
an output pin; and
a feedback pin, wherein the current-limiting circuit comprises:
a current sampling resistor;
at least one voltage conversion resistor;
a first operational amplifier;
a triode;
a first voltage divider resistor;
a second voltage divider resistor; and
a diode, wherein the output pin is connected to one end of the current sampling resistor, wherein a negative input end of the first operational amplifier is connected to one end of a first voltage conversion resistor, wherein the other end of the first voltage conversion resistor is connected to the one end of the current sampling resistor, wherein a positive input end of the first operational amplifier is connected to one end of a second voltage conversion resistor, wherein the other end of the second voltage conversion resistor is connected to the other end of the current sampling resistor, wherein an output end of the first operational amplifier is connected to a base of the triode, wherein an emitter of the triode is connected to the negative input end of the first operational amplifier, wherein a collector of the triode is connected to one end of a third voltage conversion resistor, wherein the other end of the third voltage conversion resistor is grounded, wherein the first voltage divider resistor is connected to the second voltage divider resistor in series, wherein one end of the first voltage divider resistor is connected to the other end of the current sampling resistor, wherein one end of the second voltage divider resistor is grounded, wherein a positive electrode of the diode is connected to the one end of the third voltage conversion resistor, wherein a negative electrode of the diode is separately connected to the other end of the second voltage divider resistor and the feedback pin, wherein the power supply chip is configured to:
convert an input first voltage into a second voltage; and
output the second voltage to the current-limiting circuit using the output pin, wherein the current-limiting circuit is configured to:
detect a first current that passes through the current sampling resistor;
convert the first current into a third voltage using the at least one voltage conversion resistors, the first operational amplifier, and the triode;
output a first reference voltage using the first voltage divider resistor and the second voltage divider resistor; and
output a feedback voltage to the feedback pin according to the third voltage and the first reference voltage, wherein the power supply chip is further configured to reduce the second voltage until the first current reaches a preset value when the feedback voltage is greater than a second reference voltage, and wherein the second reference voltage is a preset internal voltage of the power supply chip.

6. The electronic device according to claim 5, wherein the current-limiting circuit further comprises a second operational amplifier, wherein the positive electrode of the diode is connected to the one end of the third voltage conversion resistor, and the negative electrode of the diode is separately connected to the other end of the second voltage divider resistor and the feedback pin corresponds to:
a positive input end of the second operational amplifier connected to the other end of the second voltage divider resistor;
a negative input end of the second operational amplifier connected to the one end of the third voltage conversion resistor; and
an output end of the second operational amplifier is connected to the positive electrode of the diode, wherein the negative electrode of the diode is separately connected to the negative input end of the second operational amplifier and the feedback pin.

7. The electronic device according to claim 5, wherein outputting the feedback voltage to the feedback pin comprises that:
the feedback voltage is a difference between the third voltage and a positive break-over voltage of the diode when the third voltage is greater than a sum of the first reference voltage and the positive break-over voltage of the diode; and
the feedback voltage is the first reference voltage when the third voltage is less than or equal to the sum of the first reference voltage and the positive break-over voltage of the diode.

8. The electronic device according to claim 6, wherein outputting the feedback voltage to the feedback pin comprises that:
the feedback voltage is the third voltage when the third voltage is greater than the first reference voltage; and
the feedback voltage is the first reference voltage when the third voltage is less than or equal to the first reference voltage.

* * * * *